United States Patent
Novin et al.

(10) Patent No.: US 6,347,433 B1
(45) Date of Patent: Feb. 19, 2002

(54) FLAT PANEL DISPLAY TILT AND SWIVEL MECHANISM

(75) Inventors: Eugene Novin, Ambler; David A. Lowry, Wayne, both of PA (US)

(73) Assignee: CEMA Technologies, Inc., Bridgeport, PA (US)

( * ) Notice: Subject to any disclaimer, the term of this patent is extended or adjusted under 35 U.S.C. 154(b) by 0 days.

(21) Appl. No.: 09/335,998

(22) Filed: Jun. 18, 1999

(51) Int. Cl.[7] ................................................. A47F 1/24
(52) U.S. Cl. ............................. 16/367; 16/342; 248/917
(58) Field of Search .......................... 16/367, 235, 308, 16/342, 368; 361/679, 681, 682, 683; 248/917, 919, 920, 921, 922, 923; 74/490.06, 490.05

(56) References Cited

U.S. PATENT DOCUMENTS

| | | | |
|---|---|---|---|
| 3,322,388 A | * 5/1967 | Budreck | 16/342 |
| 4,186,905 A | * 2/1980 | Brudy | 248/478 |
| 4,630,332 A | * 12/1986 | Bisbing | 16/273 |
| 4,654,671 A | * 3/1987 | Baghdsarian | 16/366 |
| 4,744,472 A | * 5/1988 | Pfister | 16/340 |
| 5,016,849 A | 5/1991 | Wu | |
| 5,168,423 A | 12/1992 | Ohgami et al. | |
| 5,195,213 A | 3/1993 | Ohgami et al. | |
| 5,206,790 A | * 4/1993 | Thomas et al. | 16/342 |
| 5,211,368 A | 5/1993 | Kitamura | |
| 5,335,142 A | * 8/1994 | Anderson | 361/681 |
| 5,608,604 A | 3/1997 | Francis | |
| 5,752,293 A | * 5/1998 | Lowry et al. | 16/342 |
| 5,870,280 A | 2/1999 | Cho | |
| 5,873,554 A | 2/1999 | Nobuchi | |
| 5,947,440 A | * 9/1999 | Cho | 248/923 |
| 6,082,522 A | * 7/2000 | Polling | 198/370 |
| 6,101,676 A | * 8/2000 | Wahl et al. | 16/342 |
| 6,105,919 A | * 8/2000 | Min | 248/418 |

* cited by examiner

Primary Examiner—Anthony Knight
Assistant Examiner—Mark Williams
(74) Attorney, Agent, or Firm—Akin, Gump, Strauss, Hauer & Feld, L.L.P.

(57) ABSTRACT

A hinge connects a first member to a second member. The hinge includes a connector constructed of a polymeric material secured to the first member. The connector is constructed from a polymeric material and has a generally flat connector surface, and a first axis. A support is rotatably connected to the connector about the first axis. The support is constructed of a metallic material and has first and second opposing generally flat support surfaces. The first generally flat support surface is biased against the connector surface. A friction piece constructed of a polymeric material is rotatably connected to the support about the first axis and is rotatably fixed to the connector. The friction piece is biased against the second generally flat support surface. A torque element has a first end including an open portion and a closed portion. The torque element has an elongated second end extending from the closed portion. The second end of the torque element is fixedly connected to the support. A shaft extends from the second member and is rotatable about a second axis. The shaft has first and second ends, the first end of the shaft being fixedly connected to the second member. The shaft is rotatably located within the first end of the torque element. The hinge further includes a first biasing element positioned between the shaft and the support which biases the shaft to rotate about the second axis in a first direction.

26 Claims, 3 Drawing Sheets

FLAT PANEL DISPLAY TILT AND SWIVEL MECHANISM

BACKGROUND OF THE INVENTION

In the hinge field it is often necessary to control the angular position of a first member which is rotatably coupled to a second member by a hinge. A common application of such a hinge is in the computer display field. Conventional pivotable computer displays are found in laptop, notebook and palmtop computers. However, such displays typically pivot with one degree of freedom between open and closed positions. In a notebook computer, for example, the hinge housing is normally structurally fastened to the base of the computer and the shaft is connected to the screen of the computer. When the screen is rotated, it is held in an angular position by the torque generated between the friction elements in the hinge and the shaft.

Desktop displays or monitors are conventionally mounted on a desk or other flat surface proximate the user. While the monitor can move with respect to its mounting base it typically is limited to rotating about a vertical axis and pivoting about a horizontal axis to adjust the screen position. If the user wishes to vertically raise the monitor it must be moved to a fixed shelf or mounted on an adjustable arm which is secured to the desk. Such adjustable arms have to have significant structural integrity due to the size and weight of the monitor. Because of the size and weight of conventional computer monitors, there has been an emphasis on developing flat panel displays for desktop computers.

Flat panel displays are small and light enough to be mounted on an adjustable arm which can allow the user to locate the display at a particular location. Once located, the display needs to be tilted and swiveled to the correct viewing angle. Tilt and swivel devices are usually mounted on the terminal end of the adjustable arm and are directly mounted to the back of the flat panel display. The center of gravity of a flat panel display is usually located proximate the front, center of the panel due to the weight of the display screen. The flat panel display is connected to its tilt and swivel mechanism at the back, center of the flat panel display. As a result, a relatively large torque moment (e.g., between 45–50 in-lb.) is generated between the horizontal axis of rotation and the center of gravity of the flat panel display, which tends to rotate the flat panel display downward, away from a set position. The existing torque moment also counteracts a lifting force, making it difficult for a user to rotate the flat panel display upward about the horizontal axis. Thus existing tilt and swivel devices must be strong enough to hold the flat panel display in the selected tilt position, counteracting the torque created by the center of gravity of the flat panel display.

Existing tilt and swivel devices do not effectively counterbalance the torque moment inherent in flat panel displays. The conventional approach has been to create a tilt mechanism which uses a significant amount of friction to hold the flat panel display in a selected tilt position. However, the friction force which is created to maintain the flat panel display in position is problematic because it acts in both directions of tilting. Thus, to tilt the flat panel display upward the fiction force and the torque moment must be overcome and to tilt the flat panel display downward only the difference between the friction force and the torque moment must be overcome. Tilting the flat panel display upwardly against the torque moment and the friction force is often difficult for the user. Thus, depending upon the direction of movement, the user encounters a different feel as the flat panel display is tilted.

Additionally, users are desiring flat panels which can swivel about a vertical axis to enable the flat panel to be turned about the vertical axis, providing the user more flexibility in the use of the flat panel. Existing tilt and swivel devices do not provide for smooth, clean motion of the display panel with respect to the terminal end of the adjustable arm. Conventional tilt and swivel devices are also relatively expensive and with today's cost conscious computer market it is an important factor.

Hence, a need exists for a tilt and swivel device for a flat panel display which is relatively inexpensive, provides clean, smooth operation and maintains its position once it is placed in the preferred location. That is, it would be beneficial to develop a tilt and swivel device which can maintain a flat panel in the set position relative to the horizontal axis, and swivel about a vertical axis, while being cost effective due to the heavily competitive nature of the computer industry. Additionally, the hinge must be stiff enough to provide the required operational features, yet be small enough to avoid the need for an adapting plate between the hinge and the back of the panel. Further, there is a need for a tilt and swivel device which can counterbalance the torque moment of the flat panel display so that tilting movement of the flat panel display is smooth and even in both directions of movement. The present invention meets the foregoing need by providing a tilt and swivel device which is a relatively inexpensive mass producible device and which provides smooth, clean operation without backlash. In the tilt mode (i.e., pivoting about a horizontal axis) the present invention uses torque elements to achieve precise angular control and biasing elements, such as coil springs, to counteract the over center balancing of the flat panel display to allow ease of upward and downward tilting. In the swivel mode (i.e., pivoting about a vertical axis) the present invention uses, inter alia, friction between to flat surfaces of dissimilar material to control the swivel position.

BRIEF SUMMARY OF THE INVENTION

In one aspect, the present invention comprises a hinge connecting a first member to a second member. The hinge includes a support rotatably connected to the first member about a first axis. The hinge also includes a first torque element having a first end including an open portion and a closed portion. The first torque element also has an elongated second end extending from the closed portion. The second end of the first torque element is fixedly connected to the support. The hinge further includes a first shaft extending from the second member and being rotatable about a second axis. The first shaft has first and second ends, with the first end of the first shaft being fixedly connected to the second member. The first shaft is located within the first end of the first torque element. The hinge also includes a first biasing element positioned between the first shaft and the support and biasing the shaft to rotate about the second axis in a first direction.

In a second aspect, the present invention is a hinge connecting a first member to a second member. The hinge comprises a connector constructed of a polymeric material secured to the first member and having a first axis. The connector has a generally flat connector surface. The hinge also includes a support constructed of a metallic material rotatably connected to the connector about the first axis. The support has a first generally flat support surface, with the connector surface being biased against the first generally flat support surface. The second member is connected to the support.

In a third aspect, the present invention is a hinge connecting a first member to a second member. The hinge comprises a connector secured to the first member and having a first axis. The hinge also includes a support constructed of a metallic material rotatably connected to the connector about the first axis, with the support having a first generally flat support surface. The hinge also includes a friction piece constructed of a polymeric material which is rotatably connected to the support about the first axis and which is rotatably fixed to the connector. The friction piece is biased against the first generally flat support surface. The second member is connected to the support.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
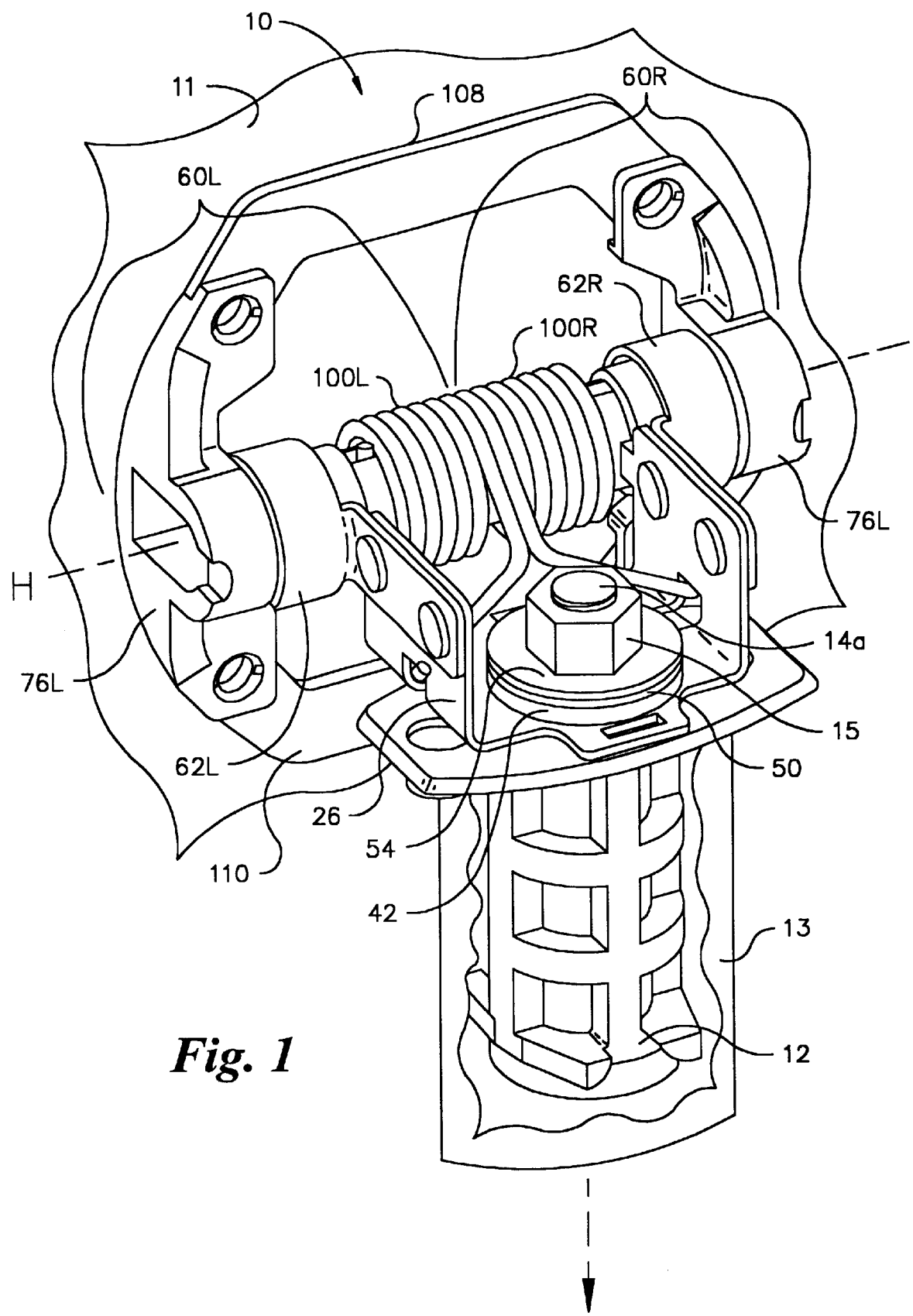
FIG. 1 is a perspective view of a hinge connecting a first member to a second member in accordance with the present invention.

Certain terminology is used in the following description for convenience only and is not limiting. The words "lower" and "upper" designate directions in the drawings to which reference is made. The words "inwardly" and "outwardly" refer to directions toward and away from, respectively, the geometric center of the flat panel hinge 10 and designated parts thereof. The words "left" and "right", as used herein, correspond to the sides of the flat panel hinge 10 as viewed in FIG. 1. The word "a" as used in the claims is defined to mean "at least one." The terminology includes the words above specifically mentioned, derivatives thereof and words of similar import. In the drawings, like numerals are used to indicate like elements throughout.

Figure 2:
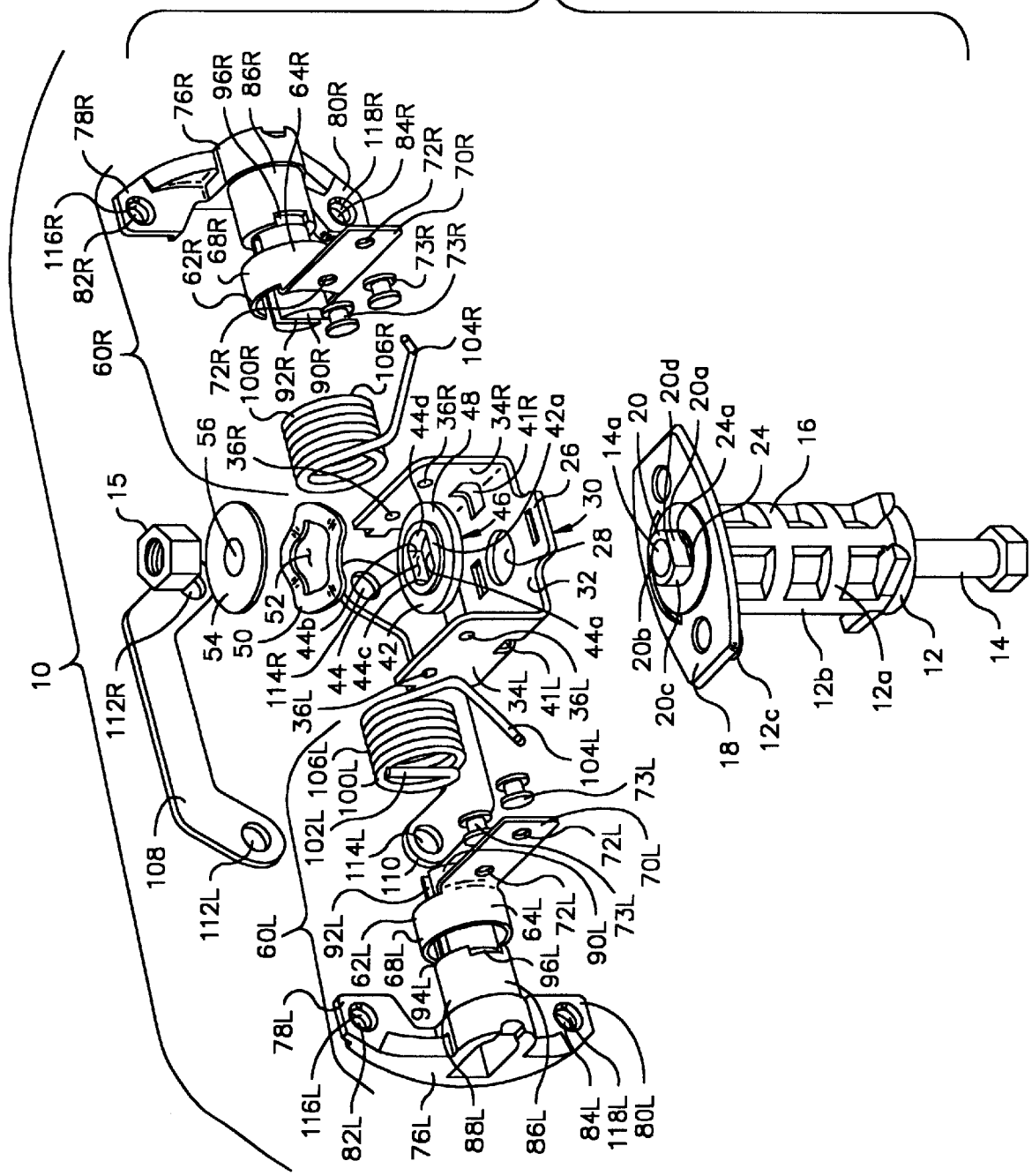
FIG. 2 is an exploded view of the hinge shown in FIG. 1.

Referring now to FIGS. 1 and 2, the present invention is a hinge, generally designated 10, for connecting a first member, such as a flat panel display 11, partially shown, with a second member or base 13, also partially shown and cut away to show a lower portion of the hinge 10, that provides tilt and swivel about two axes for the flat panel display, and includes a universal mounting standard for the back of the flat panel display 11. The hinge 10 provides both tilt and swivel capability of the flat panel display 11 relative to the base, while providing smooth movement.

The hinge 10 includes a connector or column 12 with a stiffener, preferably in the form of a through-bolt 14 extending through a vertical portion 16 of the column 12. A vertical centerline of the column 12 and the through-bolt 14 forms a first or vertical axis V. The column 12 includes a plurality of horizontal and vertical ribs 12a, 12b, respectively, extending along the outer perimeter of the column 12 which provide structural support to the column 12. The column 12 is connected to the base 13, with details of the connection not being shown. The base is preferably in the form of a telescoping tube. The telescoping tube permits the vertical height of the flat panel display 11 to be adjusted. The telescoping tube can be fixedly attached to a desktop or other location (not shown) to provide a firm mounting location for the flat panel display 11.

Preferably, the column 12 is constructed of an injection molded polymeric material such as a plastic or an equivalent. More preferably, the column 12 is constructed of 30% glass reinforced ABS plastic, although those skilled in the art will realize that other materials can be used. Also preferably, the column 12 is injection molded to make the column 12 less expensive to manufacture. The through-bolt 14 is preferably constructed from a metallic material, and more preferably steel, although those skilled in the art will realize that other materials can be used. Preferably, a closely toleranced slip fit exists between the through-bolt 14 and the column 12 to provide stiffening to the column 12 and to insure that through-bolt 14 is rotatably fixed to the column 12. Preferably, a top end 14a of the through-bolt 14 is threaded to receive an end piece, preferably in the form of a nut 15. The use of the through-bolt 14 through the column 12 provides a cost-efficient method of increasing the structural integrity of the column 12.

The column 12 has a generally flat column surface 18 located at the top of the column 12 and extending radially outwardly therefrom The column surface 18 is generally in the form of a frusto-ellipse. A pivot 20 is mounted to the top of the column surface 18 and extends vertically above the column surface 18. The pivot 20 has opposing flat surfaces 20a, 20b extending in generally vertical parallel planes. The pivot 20 also has opposing rounded surfaces 20c, 20d located between the ends of the flat surfaces 20a, 20b. A rounded lip 24 having a top surface 24a extends from the bottom of the pivot 20 along each of the flat surfaces 20a, 20b such that each rounded lip 24 has the same radius of curvature as the rounded surfaces 20c, 20d.

Figure 3:
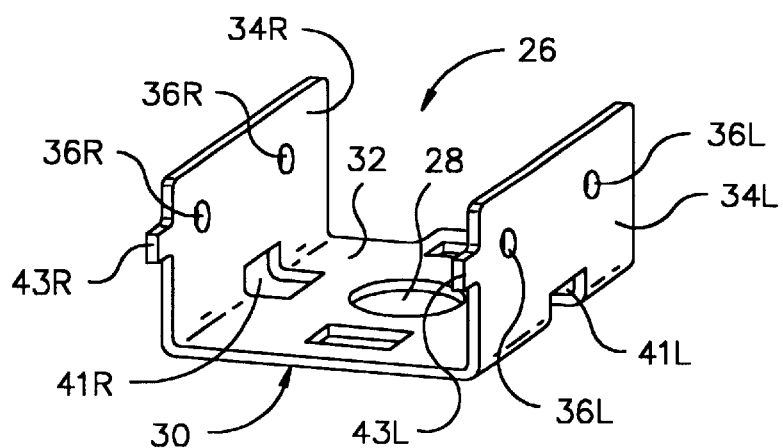
FIG. 3 is a perspective view, from the rear, of a support member used in the hinge shown in FIG. 1.

Referring now to FIGS. 2 and 3, a generally U-shaped support 26 is rotatably mounted on the column surface 18 of the column 12 about the vertical axis. The support 26 is preferably U-shaped to maximize stiffness in the direction of tilt (i.e., about a second or horizontal axis H). Preferably, the support 26 is constructed of a high strength lightweight material, such as steel, although those skilled in the art will realize that the support 26 can be made from other materials, as well.

The support 26 includes a generally centrally disposed through hole 28, a generally flat bottom support surface 30, and a generally flat top support surface 32 opposing the generally flat bottom a support surface 30. The support 26 fits over the pivot 20 with the pivot 20 extending into the through hole 28 so that the bottom support surface 30 is in substantial facing engagement with the flat column surface 18. It is preferred that the support 26 and the column surface 18 be made of different materials to provide a sufficient amount of frictional contact between the column surface 18 and the support 26 to get clean, smooth movement of the flat panel display 11 with respect to the base 13. However, those skilled in the art will realize that the support 26 and the column surface 18 can be the same materials. The through hole 28 is sized to fit snugly around the rounded surfaces 20c, 20d and each lip 24. The support 26 also includes left and right vertical sides 34L, 34R, respectively. Preferably, the top support surface 32 is above the surface 24a of each lip 24.

Each vertical side 34L, 34R includes at least two through holes 36L, 36R. As best seen in FIG. 3, the support 26 also includes a left and right spring hole 41L, 41R in each vertical side 34L, 34R, respectively and through the bottom and top support surfaces 30, 32, for reasons that will become apparent. However, those skilled in the art will realize that the spring holes 41L, 41R need only be through the vertical sides 34L, 34R. Referring to FIG. 3, keys 43L, 43R, are located at a rear top corner on each vertical side 34L, 34R, respectively.

Referring now to FIG. 2, a friction washer 42 having a generally centrally disposed hole 44 is mounted on the support 26 such that the pivot 20 snugly fits into the hole 44 and such that the friction washer 42 is rotatably secured to the through-bolt 14 and thus the column 12. The friction washer 42 is preferably made from the same polymeric material as the column 12. It is preferred that the support 26 and the friction washer 42 be made of different materials. Using different materials provides cleaner, smoother movement of the flat panel display 11 with respect to the base 13 than using the same materials. However, those skilled in the art will realize that the support 26 and the friction washer 42 can be the same materials. The hole 44 has two flat surfaces 44a, 44b and two rounded surfaces 44c, 44d located between the ends of the flat surfaces 44a, 44b that complement and engage the flat surfaces 20a, 20b and the rounded surfaces 20c, 20d of the pivot 20, respectively, so that the friction washer 42 is not free to rotate about the pivot 20.

The friction washer 42 also includes a generally flat bottom washer surface 46 on the underside of the friction washer 42, such that the bottom washer surface 46 is in substantial facing engagement with the top support surface 32 and the top surface 24a of each lip 24. The friction washer 42 also includes an annular generally flat top surface 48 surrounding a raised inner portion 42a of the friction washer 42. The through-bolt 14 extends through both the support 26 and the friction washer 42.

A generally wavy spring washer 50 having a generally centrally disposed circular hole 52 is located on the friction washer 42 such that the wavy spring washer 50 is seated on the annular flat top surface 48. The combination of the raised inner portion 42a and the flat top surface 48 provides a surface for the wavy spring washer 50 to seat on the friction washer 42. The hole 52 is sized to fit around the flat top surface 48 such that the wavy spring washer 50 surrounds the raised inner portion 42a of the friction washer 42.

A flat washer 54 having a generally centrally disposed circular hole 56 is mounted on the wavy spring washer 50 and the friction washer 42 such that the circular hole 56 of the flat washer 54 fits over the bolt 14 and seats on the wavy spring washer 50. The nut 15 is threaded onto the threads 14a of the bolt 14 to compress the wavy spring washer 50 and thereby bias the column surface 18 and the bottom support surface 30 toward each other and the top support surface 32 and the bottom friction washer surface 46 toward each other. Thus, the column surface 18, bottom support surface 30, top support surface 32 and friction washer 42 are in compression. The flat washer 54 acts as a biasing platform against which the wavy spring washer 50 acts.

Referring to FIGS. 1 and 2, a tilt assembly 60L, 60R extends from each of the left and right vertical sides 34L, 34R of the support 26, respectively. For clarity, only the tilt assembly 60L on the left vertical side 34L will be discussed, but the same description will pertain to the tilt assembly 60R on the right vertical side 34R, which is generally a mirror image of the left side 34L. The elements of the tilt assembly 60L include "L" after each element numeral, and the elements of the tilt assembly 60R include "R" instead of "L" after each element numeral, as shown in FIG. 2.

Figure 5:
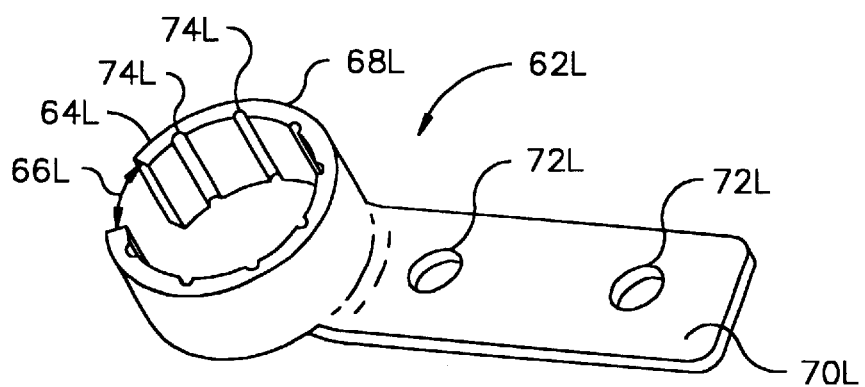
FIG. 5 is a perspective view of a left torque element used in the hinge shown in FIG. 1.

As shown in FIGS. 2 and 5, the hinge 10 includes a torque element 62L of the type which is shown and described in U.S. Pat. Nos. 5,752,293 and 5,491,874, both of which are hereby incorporated herein by reference in their entireties. The torque element 62L has a "C-shaped" open first end 64L including an open portion 66L and a closed portion 68L. The torque element 62L has an elongated second end 70L which extends from the closed portion 68L in a plane generally perpendicular to the horizontal axis H and is generally diametrically opposed from the open portion 66L. A rigid connection is formed between the first end 64L and the second end 70L such that there is little bending at the connection point between the second end 70L and the first end 64L. This type of connection provides stability to the hinge 10 and allows the flat panel display 11 to be oriented in one position without springback. The orientation of the second end 70L relative to the open portion 66L is selected to prevent or reduce bending of the torque element 62L during rotation about the horizontal axis H and to provide stiffness in the tilt direction. The second end 70L of the torque element 62L includes through holes 72L which mate with the through holes 36L in the left vertical side 34L of the support 26. The second end 70L of the torque element 62L is fixedly connected to the left vertical side 34L of the support 26 by connectors such as rivets 73L, bolts, or other types of connectors known by those skilled in the art which are inserted through the through holes 72L and 36L. The fixed connection between the torque element 62L and the support 26 prevents bending of the torque element 62L relative to the support 26.

Referring now to FIG. 5, the internal circumference of the closed portion 68L includes a plurality of grooves 74L extending generally parallel to the horizontal axis H which extends generally through the open center of the first end 64L of the torque element 62L. Preferably, the grooves 74L are spaced evenly and the depth of the grooves 74L decreases relative to its adjacent groove going from the open portion 66L to the closed portion 68L. The grooves 74L also provide a place to receive and store lubrication. The varying depth of the grooves 74L provides generally equal pressure distribution along the entire closed portion 68L of the torque element 62L, as disclosed in U.S. Pat. Nos. 5,752,293 and 5,491,874.

Figure 4:
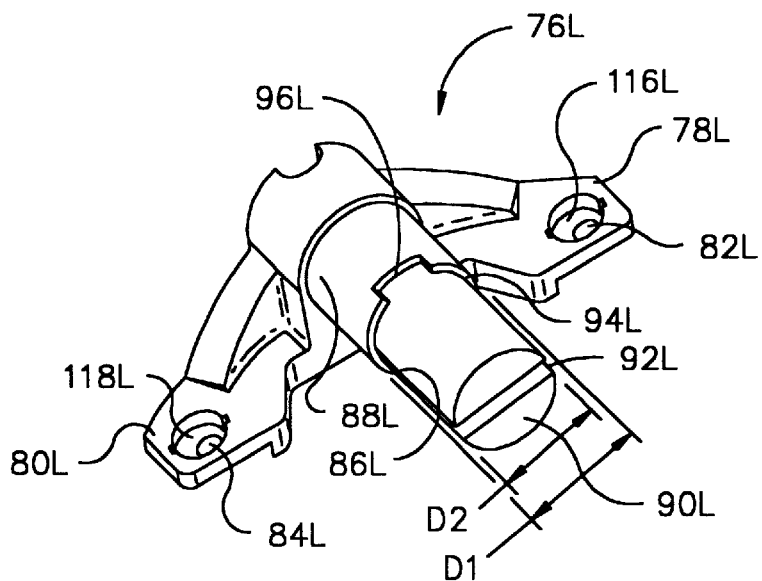
FIG. 4 is a perspective view of a left bracket used in the hinge shown in FIG. 1.

Referring now to FIGS. 1, 2 and 4, a left bracket 76L includes a top bolt hole 82L and a bottom bolt hole 84L. Although the left bracket 76L (and also the right bracket 76R) is preferably "T-shaped", those skilled in the art will realize that the left bracket 76L (and the right bracket 76R) can be other shapes, as well. A shaft 86L extends from the bracket 76L along the horizontal axis H between the top and bottom bolt holes 82L, 84L. The bracket 76L is fixedly connected to the flat panel display 11 screen (not shown) by bolts, rivets, or other suitable connectors (not shown) inserted through the bolt holes 82L, 84L in a manner well known to those skilled in the art. The size and positioning of the bolt holes 82L, 84L in the bracket 76L match industry standard holes in the back of the flat panel display 11 for mounting the hinge 10 to the back of the flat panel display 11. However, those skilled in the art will realize that the brackets 76L, 76R can be omitted, and the shaft 86L can extend directly from the flat panel display 11.

The shaft 86L has a first end 88L fixedly connected to the bracket 76L and a second end 90L. The shaft 86L further includes a longitudinal slot 92L which extends along a plane through the horizontal axis H from the second end 90L to a stepped junction 94L between the first end 88L and the second end 90L. The shaft 86L has a larger first diameter D1 between the junction 94L and the first end 88L than a second diameter D2 between the junction 94L and the second end 90L. A keyway 96L which extends approximately 30 degrees around the outer circumference of the shaft on the first diameter D1 is located on the shaft 86L proximate to the junction 94L. The key 43L fits into the keyway 96L to limit the rotation of the shaft 86L about the horizontal axis H.

Referring now to FIGS. 1 and 2, a torsion spring 100L has a first end 102L, a second end 104L, and a plurality of coils 106L therebetween. The torsion spring 100L counteracts the weight of the flat panel display 11 and any torque moment generated by the weight of the flat panel display 11 because of the spacing of its center of gravity from the horizontal axis H. Thus, the torsion spring 100L assists with keeping the panel 11 from pivoting downward. The torsion spring 100L also provides lift to the flat panel display 11, assisting the user in pivoting the flat panel display 11 upward about the horizontal axis H. The K-factor of the torsion spring 100L is selected based on the size and weight of the flat panel display 11 which the hinge 10 is to support.

The first end 102L of the torsion spring 100L is located in the slot 92L in the shaft 86L, securing the first end 102L to the shaft 86L. The second end 104L of the torsion spring 100L is located in the spring hole 41L in the left side 34L of the support 26, securing the second end 104L of the torsion spring 100L to the support 26. The first end 88L of shaft 86L is inserted inside the coils 106L of the torsion spring 100L. The torsion spring 100L is thus positioned between the shaft 86L and the support 26, biasing the shaft 86L to rotate about the horizontal axis H in a first direction (i.e., clockwise as viewed from the left end of FIG. 2).

The shaft 86L is rotatably located within the first end 64L of the torque element 62L between the slot 92L and the first end 88L of the shaft 86L. That is, the closed end 68L of the torque element 62L is positioned beyond the junction 94L. An interference fit exists between the first end 88L of the shaft 86L and the first end 64L of the torque element 62L.

An upper link 108 and a lower link 110 connect top ends 78L, 78R and the lower ends 80L, 80R of the left and right brackets 76L, 76R, respectively. Each link 108 and 110 includes a left and right mounting hole 112L, 112R and 114L, 114R. Each bolt hole 82L, 82R, 84L, 84R in the left and right brackets 76L, 76R, respectively, includes a left and right boss 116L, 116R, 118L, 118R for snapping into the respective mounting holes 112L, 112R and 114L, 114R in the upper and lower links 108, 110. The sizes of the mounting holes 112L, 112R and 114L, 114R and their distance apart from each other on both the upper and lower links 108, 110 are determined by applicable industry standards. Additionally, the distance between the top and bottom bolt holes 82L, 82R, 84L, 84R in each of the brackets 76L, 76R is also determined by industry standards. The links 108, 110 maintain the mounting holes 112L, 112R and 114L, 114R in a single plane to facilitate mounting the hinge 10 to the flat panel display 11. Those skilled in the art will realize that the links 108, 110 can be omitted in their entireties, and the brackets 76L, 76R can be connected directly to the panel.

To assemble the hinge 10, the through-bolt 14 is inserted into the column 12. The support 26, the friction washer 42, the wavy spring washer 50, and the flat washer 54 are all installed over the through-bolt 14 from the threaded end 14a of the through-bolt 14, stacking the afore-mentioned components on top of the column surface 18. The nut 15 is then installed and tightened onto the threaded end 14a of the through-bolt 14, biasing the column surface 18, the support 26, the friction washer 42, the wavy spring washer 50, and the flat washer 54 against their respective adjacent components.

Assembly of the left tilt assembly 60L is now described. The shaft 86L is inserted through the open first end 64L of the torque element 62L such that the torque element 62L is located between the first end 88L of the shaft 86L and the slot 92L. The first end 102L of the torsion spring 100L is inserted into the slot 92L from the second end 90L of the shaft 86L. The second end 90L of the shaft 86L is then positioned through the coils 106L of the torsion spring 100L until the first end 102L of the torsion spring 100L encounters the junction 94L. The process is repeated for the right tilt assembly 60R.

After both the left and the right tilt assemblies 60L, 60R are assembled, the left and right tilt assemblies 60L, 60R are connected to each other by the upper and lower links 108, 110, respectively. The upper boss 116L of the left bracket 76L is inserted into the bolt hole 112L of the upper link 108 and the upper boss 116R of the right bracket 76R is inserted into the bolt hole 112R of the upper link 108, and the lower boss 118L of the left bracket 76L is inserted into the bolt hole 114L of the lower link 110 and the lower boss 118R of the right bracket 76R is inserted into the bolt hole 114R of the lower link 114. The bosses 116L, 116R, 118L, 118R provide a press/snap fit into the bolt holes 112L, 112R, 114, 114R, securing the links 108, 110 to the brackets 76L, 76R. The links 108, 110 act to align the brackets 76L, 76R in a common plane, but those skilled in the art will realize that the brackets 76L, 76R can be connected directly to the flat panel display 11 without using the brackets 76L, 76R.

The rear of the support 26 is then slid between the second ends 70L, 70R of each of the left and right torque elements 62L, 62R, respectively, until the support through holes 36L, 36R line up with the torque element through holes 72L. At this time, the second ends 104L, 104R of the torsion springs 100L, 100R are not secured to the support 26, but are resting on top of the top support surface 32 of the support 26. The rivets 73L, 73R are then installed through the lined up through holes 36L, 36R, 72L, 72R, securing the second end 70L of the left torque element 62L to the left vertical side 34L of the support 26 and securing the second end 70R of the right torque element 62R to the right vertical side 34R of the support 26.

A spring loading tool (not shown) is used to force the second ends 104L, 104R of the left and right torsion springs 100L, 100R into the left and right spring holes 41L, 41R, respectively, securing the second ends 104L, 104R of the torsion springs 100L, 100R to the support 26. The hinge 10 is now assembled and ready to connect the brackets 76L, 76R to the flat panel display 11 and to connect the column 12 to the base.

The clamping force of the nut 15 biases the column surface 18 against the bottom support surface 30 and the top support surface 32 against the bottom washer surface 46. The wavy spring washer 50 is also biased against the top washer surface 48. Since the column 12 and the support 26 are preferably constructed of two different materials, more preferably a polymer and a metal, respectively, the biasing of the column surface 18 against the bottom support surface 30 produces a first relatively large frictional effect when the surfaces 18, 30 are rotated relative to each other. Similarly, since the support 26 and the friction washer 42 are constructed of two different materials, more preferably a metal and a polymer, respectively, the biasing of the top support surface 32 against the bottom washer surface 46 produces a second relatively large frictional effect when the surfaces 32, 46 are rotated relative to each other. The net effect of the first and second relatively large frictional effects is to provide for smooth rotation of the support 26 on the column 12 without excessive slack or play between the support 26 and the column 12.

Since the column surface 18 against the bottom support surface 30 and the top support surface 32 against the bottom washer surface 46 create friction when rotated relative to each other, it is expected that the column surface 18, the bottom support surface 30, the top support surface 32, and the bottom washer surface 46 will experience wear over a prolonged period of time. The wavy spring washer 50 is used to force the column surface 18 against the bottom support surface 30 and the top support surface 32 against the bottom washer surface 46 to remain biased against each other by pushing generally downward along the vertical axis V to thereby compensate for wear.

The interaction between the keys 43L 43R and the keyways 96L, 96R, respectively, allows the user to rotate the flat panel hinge about the horizontal axis H over a range of preferably from about 25 degrees away from the front of the hinge 10 to about 5 degrees toward the front of the hinge 10 for a total range of rotation of generally 30 degrees. However, those skilled in the art will realize that the keyways 96L, 96R can be located at different locations along the shaft 86L, 86R and/or can be different arcuate lengths, providing different ranges of movement of the tilt assemblies 60L, 60R relative to the support 26.

Each of the left and right torque elements 62L, 62R is geometrically configured to have substantially uniform strength whereby substantially uniform forces are created between each of the left and right shafts 86L, 86R, respectively, to provide torque transfer and angular positional control of the left and right shafts 86L, 86R with respect to the left and right torque elements 62L, 62R, respectively. The interference fit of the second end 90L of the shaft 86L with the first end 64L of the torque element 62L and the interference fit of the second end 90R of the shaft 86R with the first end 64R of the torque element 62R provide a smooth rotation of the tilt assembly 60R relative to the support 26.

The combination of the torsion springs 100L, 100R and the torque elements 62L, 62R results in smooth movement of the flat panel display 11. The torsion springs 100L, 100R are necessary to counteract the torque moment generated by the flat panel display 11, which is not mounted to pivot about its center of gravity. The torsion springs 100L, 100R balance the weight of the flat panel display 11, so that the flat panel display 11 can be tilted upwardly and downwardly about the horizontal axis H easily and with generally the same force.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. A hinge connecting a first member to a second member, the hinge comprising:
   a support rotatably connected to the first member about a first axis;
   a first torque element having a first end including an open portion and a closed portion, the first torque element having an elongated second end extending from the closed portion, the second end of the first torque element being fixedly connected to the support;
   a first shaft extending from the second member and being rotatable about a second axis, the first shaft having first and second ends, the first end of the first shaft being fixedly connected to the second member, the first shaft being rotatably located within the first end of the first torque element; and
   a first biasing element positioned between the first shaft and the support and biasing the shaft to rotate about the second axis in a first direction.

2. The hinge according to claim 1 wherein the first biasing element comprises a first torsion spring having first and second ends and a plurality of coils therebetween, the first end of the first torsion spring being secured to the first shaft, the second end of the first torsion spring being secured to the support, and the plurality of coils surrounding the first shaft.

3. The hinge according to claim 2 wherein the second end of the first shaft further comprises a first slot extending along a plane through the second axis from the second end to a location between the first end and the second end of the first shaft and wherein the first end of the first torsion spring is located in the first slot.

4. The hinge according to claim 3 wherein the first shaft is rotatably located within the first end of the first torque element between the first slot and the first end of the first shaft.

5. The hinge according to claim 1 further comprising a connector secured to the first member, the support being rotatably mounted to the connector.

6. The hinge according to claim 1 further comprising a first bracket fixedly connected to the second member, the first shaft extending from the first bracket.

7. The hinge according to claim 1 further comprising:
   a second torque element having a first end including an open portion and a closed portion, the second torque element having an elongated second end extending from the closed portion, the second end of the second torque element being fixedly connected to the second element;
   a second shaft extending from the second member and being rotatable about the second axis, the second shaft having first and second ends, the first end of the second shaft being fixedly connected to the second member, the second shaft being rotatably located within the first end of the second torque element; and
   a second biasing element positioned between the second shaft and the support and biasing the shaft to rotate about the second axis in the first direction.

8. The hinge according to claim 7 wherein the second biasing element comprises a second torsion spring having first and second ends and a plurality of coils therebetween, the first end of the second torsion spring being secured to the second shaft, the second end of the second torsion spring being secured to the support, and the plurality of coils surrounding the second shaft.

9. The hinge according to claim 8 wherein the second end of the second shaft further comprises a second slot extending along a plane through the second axis from the second end to a location between the first end and the second end of the second shaft and wherein the first end of the second torsion spring is located in the second slot.

10. The hinge according to claim 9 wherein the second shaft is rotatably located within the first end of the second torque element between the second slot and the first end of the second shaft.

11. The hinge according to claim 7 further comprising a second bracket fixedly connected to the second member, the second shaft extending from the second bracket.

12. The hinge according to claim 11 wherein the first and second brackets are connected by a link.

13. The hinge according to claim 7 wherein the first end of each of the first and second torque elements is "C-shaped".

14. The hinge according to claim 13 wherein the second end of each of the first and second torque elements is generally diametrically opposed from the open portion of each of the first and second torque elements, respectively.

15. The hinge according to claim 14 wherein the second end of each torque element is positioned in a plane generally perpendicular to the second axis.

16. The hinge according to claim 13 wherein an interference fit exists between the first shaft and the first end of the first torque element and between the second shaft and the first end of the second torque element.

17. The hinge according to claim 16 wherein each of the first and second torque elements is geometrically configured to have substantially uniform strength whereby substantially uniform forces are created between each of the first and second torque elements and the first and second shafts, respectively, to provide torque transfer and angular positional control of the first and second shafts with respect to the first and second torque elements, respectively.

18. A hinge connecting a first member to a second member, the hinge comprising:
a connector constructed of a polymeric material secured to the first member and having a first axis, the connector having a generally flat connector surface; and
a support constructed of a metallic material rotatably connected to the connector about the first axis, the support having a first generally flat support surface, the connector surface being biased against the first generally flat support surface, the second member being connected to the support.

19. The hinge according to claim 18, further comprising a friction piece rotatably secured to the connector about the first axis and wherein the support further includes a second generally flat support surface, the friction piece being biased against the second generally flat support surface.

20. The hinge according to claim 19 wherein the friction piece is constructed of a polymeric material.

21. The hinge according to claim 18 wherein the connector includes a metal stiffener at least partially disposed within the polymeric material along the first axis, the stiffener extending through the support and the friction piece.

22. The hinge according to claim 21, further comprising a wavy spring washer mounted on the stiffener and being retained thereon by an end piece such that the connector surface, support surface and friction piece are biased into compression.

23. A hinge connecting a first member to a second member, the hinge comprising:
a connector secured to the first member and having a first axis;
a support constructed of a metallic material rotatably connected to the connector about the first axis, the support having a first generally flat support surface; and
a friction piece constructed of a polymeric material rotatably connected to the support about the first axis and being rotatably fixed to the connector, the friction piece being biased against the first generally flat support surface, the second member being connected to the support.

24. The hinge according to claim 23, wherein the support further comprises a second generally flat support surface and the connector includes a generally flat connector surface, the connector surface being biased against the second support surface.

25. The hinge according to claim 24 wherein the connector is constructed from a polymeric material.

26. The hinge according to claim 25 wherein the connector includes a metal stiffener at least partially disposed within the polymeric material along the first axis, the stiffener extending through the support and the friction piece.

* * * * *